No. 686,834. Patented Nov. 19, 1901.
H. P. RASMUSSEN & W. HAGERTY.
PNEUMATIC HUB FOR CYCLE OR OTHER WHEELS.
(Application filed June 7, 1901.)
(No Model.)
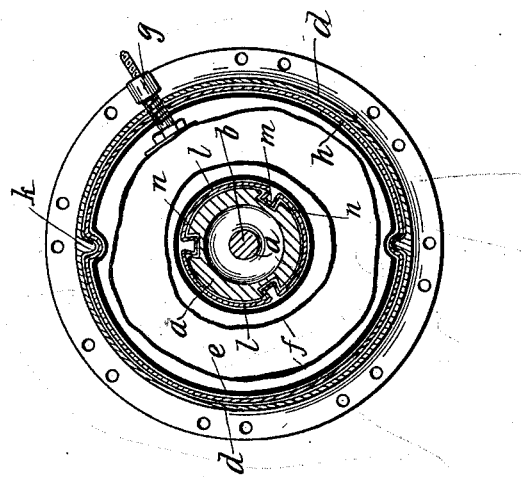
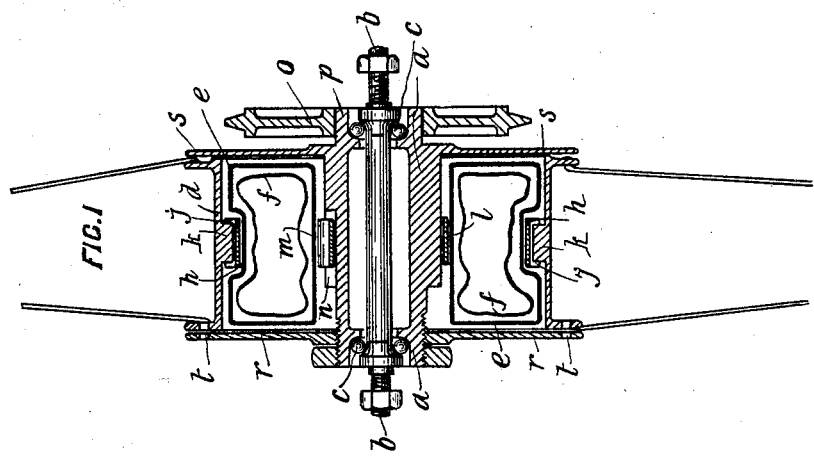
WITNESSES:
INVENTORS.
ATTORNEYS.

UNITED STATES PATENT OFFICE.

HANS PETER RASMUSSEN AND WILLIAM HAGERTY, OF WINTON, SOUTH-LAND, NEW ZEALAND.

PNEUMATIC HUB FOR CYCLE OR OTHER WHEELS.

SPECIFICATION forming part of Letters Patent No. 686,834, dated November 19, 1901.

Application filed June 7, 1901. Serial No. 63,644. (No model.)

*To all whom it may concern:*

Be it known that we, HANS PETER RASMUSSEN and WILLIAM HAGERTY, subjects of the King of Great Britain, residing at Winton, Southland, in the Colony of New Zealand, have invented new and useful Improvements in Pneumatic Hubs for Cycle or other Wheels; and we do hereby declare the following to be a full, clear, and exact description of the same.

This invention relates to that class of wheel for cycles and other vehicles in which the hub is provided with pneumatic cushions for the purpose of reducing the vibrations due to the wheel running over or against obstacles and in which the pneumatic tire is dispensed with and replaced by a solid-rubber one.

The invention consists, essentially, in the construction of the hub of the wheel and in the manner in which the pneumatic ring or cushion is inserted and secured therein.

We will describe our invention with relation to the accompanying sheet of drawings, in which—

Figure 1 is a cross-sectional elevation of the hub of a cycle-wheel constructed according to our invention. Fig. 2 is a sectional elevation of the same.

The hub consists of an inner metal ring $a$, provided at each end with suitable ball-races and loosely through which passes the ordinary spindle $b$. This spindle is provided with ball-races corresponding to the races in the ring $a$, and rings of balls $c$ are inserted between them, so that the ring $a$ may revolve freely upon the spindle. Concentric with the ring $a$ is another ring $d$, to flanges on the edges of which the spokes of the wheel are attached. This ring is made of considerably larger diameter than the inner ring $a$, so that an annular space is left between them. Into the annular space between the rings $a$ and $d$ is inserted a pneumatic cushion, which consists of an outer cover $e$ and an inner tube $f$, provided with the ordinary valve connection $g$, which passes through a hole in the outer ring $d$ and whereby the tube may be inflated. Secured to the outside periphery of the cover $e$ is a flat steel band $h$, that is formed with grooves or indentations $j$ at intervals, that fit over projections $k$ upon the inside periphery of the outer ring $d$. By these means the pneumatic cushion will be prevented from turning in the hub. To the outside of the inner circular wall of the cover $e$ is secured another flat steel band $l$, that is formed with dovetailed projections $m$, that slide into dovetailed grooves $n$ in the outer periphery of the inner ring $a$.

The driving-pinion $o$ is rigidly secured to a projection $p$ of the ring $a$, so that when it is caused to revolve the ring will revolve with it. As the ring $a$ revolves it will carry around with it the steel band $l$ and outer cover $e$, and the motion will thus be imparted to the outer steel band $h$, which in its turn will impart the revolving motion to the outer ring $d$ of the hub, and consequently to the whole of the wheel. The flat steel bands $h$ and $l$ are kept in close and rigid contact with the hub-rings $d$ and $a$, respectively, by inflating the air-tube $f$, so that it shall press out against the whole of the inner surface of the outer covering $e$.

The sides of the annular space inclosed by the hub-rings $a$ and $d$ are covered by means of the flat disks $r$ and $s$, which are either formed in one with the hub-ring $a$ or screwed thereupon. These disks revolve with the hub, but do not assist in driving it, and in ordinary circumstances serve only to keep the pneumatic cushion in its place and to insure that the wheel shall run truly. The revolution of the wheel depends upon the motion of the sprocket-pinion being imparted to it through the agency of the inner ring of the hub and the grooves and projections of the flat steel bands secured to the inner and outer peripheries of the covering $e$ engaging with the corresponding projections and grooves in the two rings of the hub. Should the air-cushion through any cause be destroyed while upon a journey and the flat bands $h$ and $l$ prevented from satisfactorily performing their functions, the disk $r$ is provided with holes $t$, whereby pins or screws may be inserted therethrough and the disk fastened to and made one with the outer hub-ring $d$, so that the revolving motion of the disk will be imparted to the wheel.

It will thus be seen that between the ends of the spokes of the wheel and the spindle or axle to which the forks of the cycle are secured there is a cushion of air, so that on any jar being given to the rim of the wheel the jarring motion will be compensated for by the air-cushion, and little or no jar or vibration will be transmitted to the axle, and consequently to the seat or handles of the machine.

We have described our invention with relation to cycle-wheels; but it will readily be understood that the construction of hub herein set out may be adapted to any other class of wheel, whether the same is driven from the rim, as in the case of ordinary vehicle-wheels, or from the hub.

What we claim as our invention, and desire to secure by Letters Patent, is—

1. In hubs of cycle and other wheels, a pneumatic cushion inserted between the outer and inner rings of the hub such pneumatic cushion being composed of an inner air-tube and an outer covering to the inner and outer peripheries of which bands are secured, such bands being formed at intervals with projections and grooves that engage with corresponding grooves and projections in the inner and outer rings of the hub, as herein specified.

2. In hubs of cycle and other wheels, an inner annular ring loosely surrounding the wheel-axle and provided on its outer periphery with a number of dovetailed grooves for the insertion therein of corresponding dovetailed projections upon a band surrounding it as herein specified.

In testimony whereof we have signed this specification in the presence of two subscribing witnesses.

HANS PETER RASMUSSEN.
   WILLIAM HAGERTY.

Witnesses:
 W. ALEXANDER,
 IVY W. BARRAUD.